O. DORSEY.
Harvester Rake.
No. 1,067. Reissued Oct. 23, 1860.
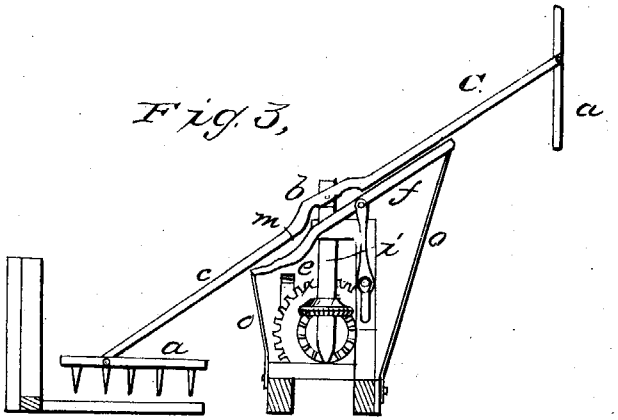
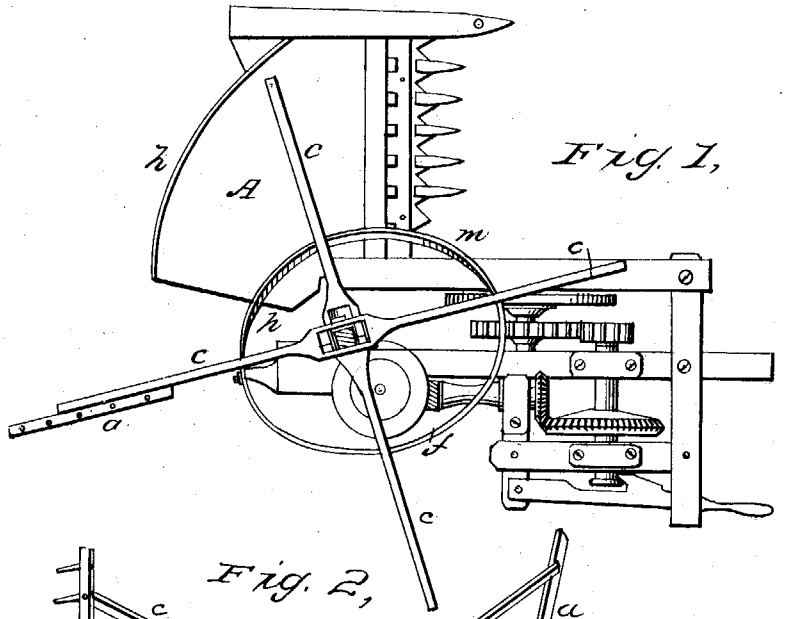
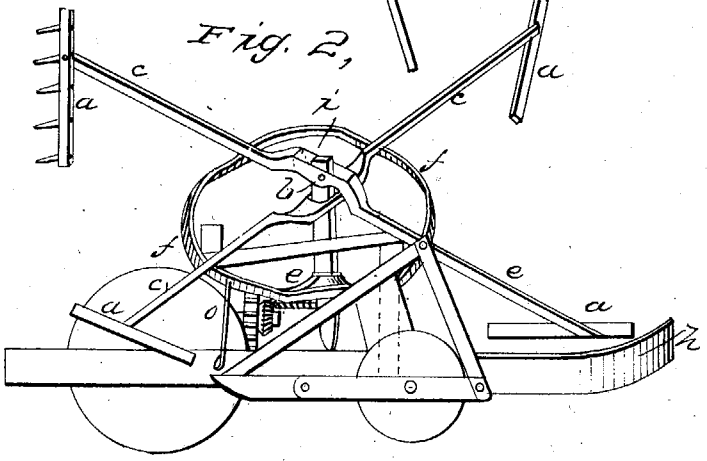
N. PETERS, Photo-Lithographer, Washington, D. C.

UNITED STATES PATENT OFFICE.

OWEN DORSEY, OF DORSEYVILLE, MARYLAND.

IMPROVEMENT IN HARVESTER-RAKES.

Specification forming part of Letters Patent No. 14,350, dated March 4, 1856; Reissue No. 1,067, dated October 23, 1860.

*To all whom it may concern:*

Be it known that I, OWEN DORSEY, of Dorseyville, in the county of Howard and State of Maryland, have invented a new and Improved Raking Device for Harvesters; and I do hereby declare that the following is a full, clear, and exact description of the same, reference being had to the annexed drawings, making a part of this specification, in which—

Figure 1 is a top view of a harvester with my invention applied to it; Fig. 2, a side elevation of the same; Fig. 3, an end elevation of the same.

Similar letters of reference indicate corresponding parts in the several figures.

This invention consists in the employment or use of a continuously-revolving raking device in connection with a horizontal curved platform over which the rakes move, the raker being so operated that its rake or rakes descend as they approach the forward end of the platform and move back over it in a horizontal curved plane, sweeping the cut grain therefrom, and rising after accomplishing this work, so as to pass in an elevated position out of the way and toward the forward end of the platform for a succeeding operation.

To enable those skilled in the art to fully understand and construct my invention, I will proceed to describe it.

The raking device is formed of four arms, *c c c c*, each pair of arms being formed of a metal or wooden bar, and having a longitudinal mortise or opening, *c'*, at their centers, so that they may be fitted on the upper part of a vertical rotating shaft.

*a a* are rake-heads attached to the ends of the arms *c c* at a suitable angle. The vertical rotating shaft *i* has its upper part squared to receive the arms *c*, and a bolt, *b*, passes through the shaft and through the arms, said bolts serving as pivots on which the arms work, the latter having an undulating as well as a rotating movement, as hereinafter described. The shaft *i* is rotated by a gear-wheel, *e*, from the master-wheel.

*f f* represent semicircular portions of a camway or rail, upon which the arms *c* rest and have their movement, and in order to facilitate the travel of the arms on the camway or rail the former may be provided with friction-rollers. The camway or rail serves as a guide for the arms, and causes the arms as they approach the front end of the platform A to drop or descend and pass over the platform in a horizontal plane to sweep the cut grain therefrom, the rakes being then made to rise and pass out of the way to the front end of the platform. To effect this result the camway at the junction of the half-circles *f f* is provided with short inclined portions *m*. (See Fig. 3.) The object of this is to permit the arms of the rakes to be suddenly dropped at the cutting-edge of the platform and suddenly raised at the delivery side thereof. The main portion of the camway is inclined at or near an angle of forty-five degrees with shaft *i*, and the tendency of the slope or inclination is toward the platform A, the general arrangement being such that the rake-heads are brought by a sweeping descent upon the front edge of the platform, and in so doing draw the uncut grain toward the cutters. Then the rake passes over the platform with a sweep or quarter-circle and forms a side delivery at the rear of the driving-wheel. *h* is a curved fender-board raised on the side edge of the platform A.

The machine in the cutting and gearing portions is such as are now in use.

The camway is supported by metal rods O O, and by these rods it may be adjusted.

The operation of the raker is as follows: As the rake-heads pass over the platform A their movement is horizontal, the arms *c* passing over the camway from *m* to *h'*, Fig. 1; but on reaching the edge of the platform the rake-heads are suddenly raised by the arms passing up the incline *m* (see Fig. 3) of the camway, while the fellow rake-head of each rising one descends in an inversely corresponding manner, and reaching over the heads of the grain gradually descends on the camway and draws the grain toward the cutters. By this means I dispense entirely with the ordinary reel, and by the quick inclines at *m* the raising and lowering of the rakes are rapidly performed, while the movement of the rakes over the platform is slow and steady, thereby preventing any scattering of the grain in its side delivery, and the deposit of it is made in proper gavels or bundles, out of the track of the succeeding round of the machine. The rakes and arms, being balanced, work with little expenditure of power, and being exceedingly simple are not so liable to be thrown out of order, besides the small expense of adjusting it to harvesters now in use is not to be overlooked.

Having thus described my invention, what I claim as new, and desire to secure by Letters Patent, is—

1. In combination with a curved horizontal platform of a harvesting-machine, a continuously-revolving raking device, the rakes of which rise and fall as they rotate, and as they approach the front part of the platform descend to the level of the latter and sweep over it, raking the cut grain therefrom, and then rise at the discharge end of the platform, out of the way, and move toward the front end of the same to repeat the operation, substantially as described.

2. The construction of the raking device as shown and described—to wit, the rake-arms *c c c c*, each pair being slotted at their centers and pivoted on the rotating shaft *i* to admit of the rotating and undulating or rising and falling movement of the rakes, substantially as described.

3. In combination with the rake-arms *c*, the inclined camway or rail *f*, the latter serving as a guide for the former, as specified.

OWEN DORSEY.

Witnesses:
JOHN RIDGELY,
SELLMAN DORSEY.